(12) United States Patent
Oki et al.

(10) Patent No.: US 7,030,354 B2
(45) Date of Patent: Apr. 18, 2006

(54) AUTOMATICALLY CONTROLLING APPARATUS AND AN AUTOMATICALLY CONTROLLING SYSTEM OF A BOARDING BRIDGE, WHICH CAN IMPROVE A RELIABILITY DUE TO AN AUTOMATIC OPERATION, AND A POSITION MATCHING METHOD OF A BOARDING BRIDGE

(75) Inventors: Junji Oki, Aichi-ken (JP); Keisuke Nakahama, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 243 days.

(21) Appl. No.: 10/318,176

(22) Filed: Dec. 13, 2002

(65) Prior Publication Data

US 2003/0136898 A1    Jul. 24, 2003

(30) Foreign Application Priority Data

Jan. 24, 2002    (JP)    ............................... 2002/015279

(51) Int. Cl.
   *E01D 1/00*    (2006.01)

(52) U.S. Cl. ............................ 250/206.2; 250/222.1; 14/71.1; 14/71.5; 356/622; 340/958

(58) Field of Classification Search ................ 250/221, 250/206.1, 206.2, 559.29, 559.3, 559.37; 14/69.5, 71.1, 71.5, 71.7; 356/614, 615, 356/622, 139.03; 244/161, 114 R; 340/958, 340/942; 348/142; 701/3
See application file for complete search history.

(56) References Cited

U.S. PATENT DOCUMENTS

| 3,683,440 | A | * | 8/1972 | Xenakis et al. | ............... 14/71.5 |
| 3,917,196 | A | * | 11/1975 | Pond et at. | |
| 4,249,159 | A | * | 2/1981 | Stasko | |
| 4,994,681 | A | * | 2/1991 | Mann | |
| 6,552,327 | B1 | * | 4/2003 | Anderberg | ................... 250/221 |
| 6,637,063 | B1 | * | 10/2003 | Hutton et al. | ................. 14/71.5 |
| 6,724,314 | B1 | * | 4/2004 | Hutton | ..................... 340/686.1 |

* cited by examiner

*Primary Examiner*—Thanh X. Luu
*Assistant Examiner*—Stephen Yam
(74) *Attorney, Agent, or Firm*—Wenderoth, Lind & Ponack, L.L.P.

(57) ABSTRACT

An automatic controlling apparatus of a boarding bridge to match a position of the boarding bridge with an airplane, includes: a light irradiator, an optical sensor, and an actuator. The light irradiator irradiates a light to the airplane. The optical sensor can detect a reflection wave of the light reflected from the airplane. The actuator moves the boarding bridge such that a position of the boarding bridge is matched with the airplane, based on a detection result of the reflection wave detected by the optical sensor.

4 Claims, 7 Drawing Sheets

AIRPLANE SIDE

BOARDING BRIDGE SIDE

AUTOMATICALLY CONTROLLING APPARATUS AND AN AUTOMATICALLY CONTROLLING SYSTEM OF A BOARDING BRIDGE, WHICH CAN IMPROVE A RELIABILITY DUE TO AN AUTOMATIC OPERATION, AND A POSITION MATCHING METHOD OF A BOARDING BRIDGE

BACKGROUND OF THE INVENTION

1. Field of the Invention

The present invention relates to an automatic controlling apparatus and an automatic controlling system of a boarding bridge, and a position matching method of a boarding bridge.

2. Description of the Related Art

FIG. 1 shows a boarding bridge for a passenger to get into a medium-size or large airplane. The operation of a boarding bridge 101 implies that the boarding bridge 101, which is operated by one or two operators, is connected to a door inlet of an airplane (not shown).

Conventionally, the operation was a manual operation based on experience. That is, the operator, while visually watching a positional relation to the airplane through a window 102 installed in the boarding bridge 101, operates the boarding bridge 101 and docks it with the airplane.

The operation of the boarding bridge 101 requires experienced flight crews. A large airport (for example, such as Los Angeles and Denver) has 100 or more gates, and requires many operators.

Also, there may be a risk of damage to the airplane caused by an erroneous operation.

SUMMARY OF THE INVENTION

The present invention has been made to solve the above-described problems of the conventional system by providing an automatic controlling apparatus and an automatic controlling system of a boarding bridge. Therefore, an object of the present invention is to provide an automatic controlling apparatus and an automatic controlling system of a boarding bridge, which can improve a reliability due to an automatic operation, and a position matching method of a boarding bridge.

Another object of the present invention is to provide an automatic controlling apparatus and an automatic controlling system of a boarding bridge, in which an automatic operation enables the saving of a number of flight crews and operators, which leads to a reduction in an airport servicing cost.

In order to achieve an aspect of the present invention, an automatic controlling apparatus of a boarding bridge to match a position of the boarding bridge with an airplane, includes: a light irradiator which irradiates a light to an airplane; an optical sensor that can detect a reflection wave of light reflected from the airplane; and an actuator which moves the boarding bridge such that a position of the boarding bridge is matched with the airplane, based on a detection result of the reflection wave detected by the optical sensor.

In this case, the light irradiator irradiates the light to a reflector provided on the airplane, and the optical sensor detects the reflection wave reflected from the reflector.

Also in this case, the light irradiator and the optical sensor are placed at positions close to each other.

Further in this case, the light irradiator and the optical sensor are placed in a periphery of a connector of the boarding bridge connected to the airplane.

In this case, the light irradiator and the optical sensor are placed in a periphery of a connector of the boarding bridge connected to the airplane.

Also in this case, the reflector has a sufficient flexibility to cope with any curvature of any type of the airplane.

In order to achieve another aspect of the present invention, an automatic controlling system of a boarding bridge to match a position of the boarding bridge with an airplane, includes: first and second reflectors; first and second optical input/output units; and an actuator, wherein the first and second reflectors are placed at a same height with each other, wherein the first and second optical input/output units are placed at a same height with each other on a connector of the boarding bridge connected to a door inlet of the airplane, wherein the first and second optical input/output units include first and second light irradiators which irradiate lights to the first and second reflectors and first and second optical sensors that can detect reflection waves reflected from the first and second reflectors of the lights, respectively, and wherein the actuator moves the boarding bridge such that positions of the boarding bridge and the airplane are matched with each other, based on a detection result of the reflection waves detected by the first and second optical sensors.

In this case, the first and second reflectors are placed near the door inlet of the airplane.

Also in this case, the first light irradiator and the first optical sensor are placed at positions close to each other, and the second light irradiator and the second optical sensor are placed at positions close to each other.

Further in this case, each of first and second reflectors has a sufficient flexibility to cope with any curvature of any type of the airplane.

In order to achieve still another aspect of the present invention, a position matching method of a boarding bridge to match a position of the boarding bridge with an airplane, includes: (a) detecting a reflection wave of light irradiated to an airplane to generate a first detection result; (b) moving a boarding bridge such that height positions of the airplane and the boarding bridge are matched with each other, based on the first detection result; (c) detecting a reflection wave of light irradiated to the airplane to generate a second detection result; (d) moving the boarding bridge such that angles of the airplane and the boarding bridge are matched with each other and a distance between the airplane and the boarding bridge is separated by a first distance or more based on the second detection result; and (e) moving the boarding bridge such that the distance is shorter than the first distance.

In this case, (d) is executed after (b).

Also in this case, (e) is executed after (d).

Further in this case, (e) is executed after (d).

In this case, the position matching method of a boarding bridge further includes: (f) detecting a reflection wave of light irradiated to the airplane to generate a third detection result, and wherein (e) is executed based on the third detection result.

Also in this case, the position matching method of a boarding bridge further includes: (f) detecting a reflection wave of light irradiated to the airplane to generate a third detection result, and wherein (e) is executed based on the third detection result.

Further in this case, the position matching method of a boarding bridge further includes: (f) detecting a reflection wave of light irradiated to the airplane to generate a third detection result, and wherein (e) is executed based on the third detection result.

In this case, the position matching method of a boarding bridge further includes: (f) detecting a reflection wave of light irradiated to the airplane to generate a third detection result, and wherein (e) is executed based on the third detection result.

DESCRIPTION OF THE PREFERRED EMBODIMENTS

An embodiment of an automatic controlling system of a boarding bridge in the present invention will be described below with reference to the attached drawings.

Figure 1:
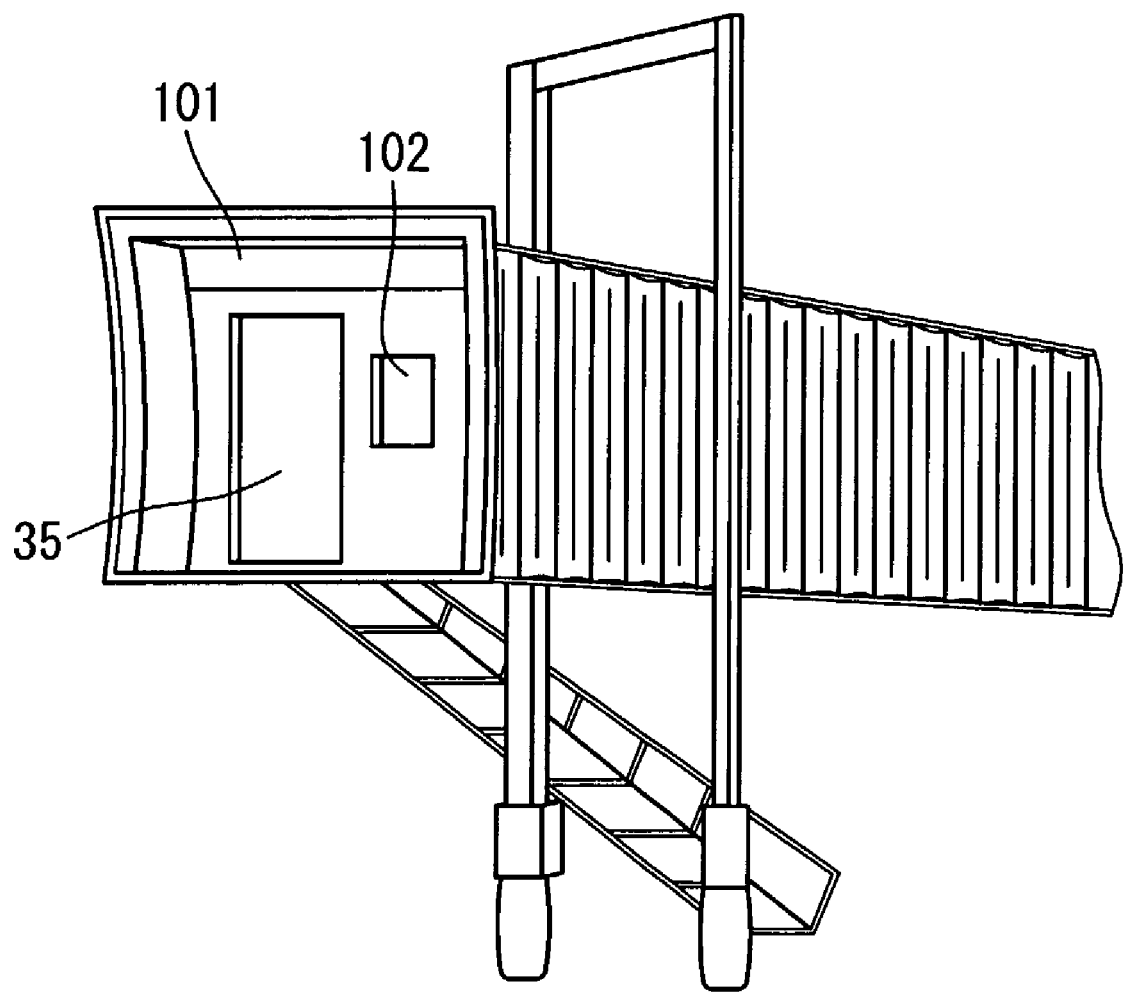
FIG. 1 is a view showing a configuration of a conventional boarding bridge.
Figure 2:
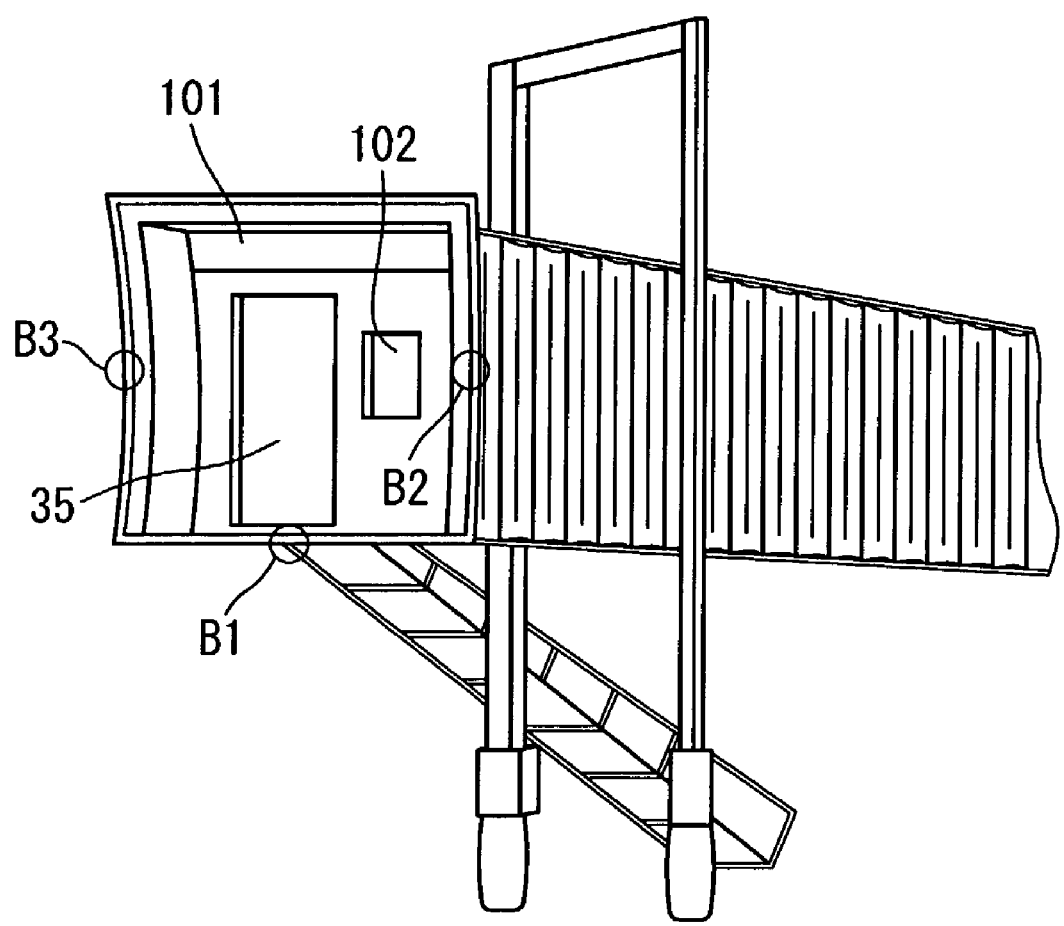
FIG. 2 is a view showing a configuration of a boarding bridge used in a first embodiment of an automatic controlling apparatus of a boarding bridge in the present invention.

FIG. 2 is a view diagrammatically showing a method in this embodiment.

In this embodiment, optical sensors B1, B2 and B3 are placed in a boarding bridge 101 to thereby detect a distance and a direction from a target (reflector) on an airplane side. Then, a docking with the airplane is controlled in accordance with the detected result.

Figure 3A:
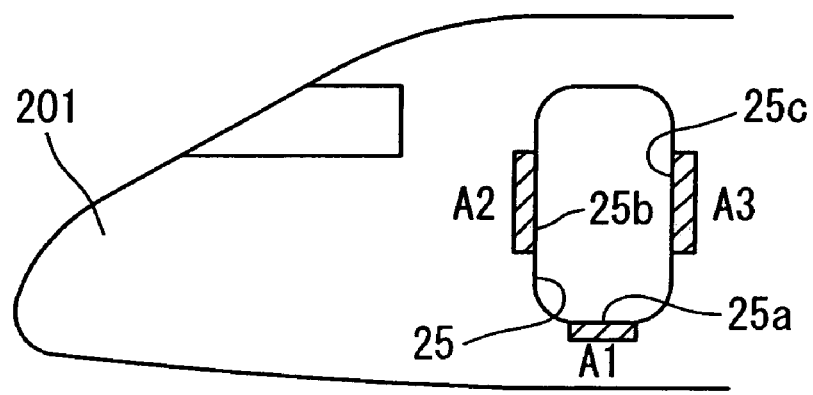
FIG. 3A is a view diagrammatically showing a configuration of a main portion of an airplane used in the first embodiment of the automatic controlling apparatus of the boarding bridge in the present invention.
Figure 3B:
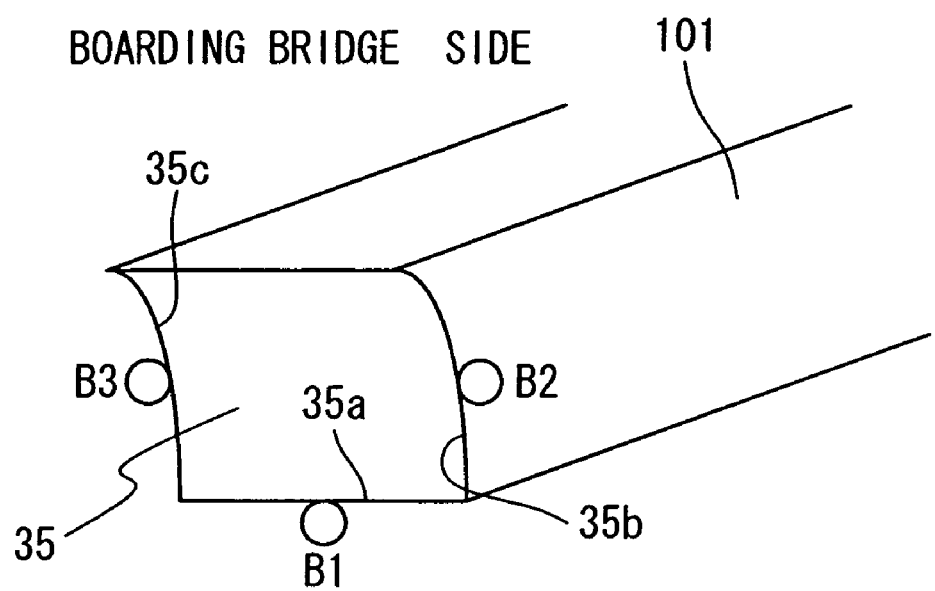
FIG. 3B is a view diagrammatically showing a configuration of a main portion of a boarding bridge used in the first embodiment of the automatic controlling apparatus of the boarding bridge in the present invention.

As shown in FIGS. 3A, 3B, optical targets (reflectors) A1, A2 and A3 are placed in a door inlet 25 of an airplane 201. Sets B1, B2 and B3 composed of laser irradiators and receivers and a controller are placed on the side of the boarding bridge 101. Then, the boarding bridge 101 is connected to the airplane 201 by an automatic operation.

The optical targets A1, A2 and A3 may be, for example, mirrors for carrying out irregular reflections.

The side of the boarding bridge 101, while calculating a relative position between the airplane 201 and the boarding bridge 101 from an incident angle of a reflected laser, puts the boarding bridge 101 close to the airplane 201.

The side of the boarding bridge 101 can carry out the automatic control in the upper and lower directions so as to cope with an error caused by a pay-load and a difference of a door position resulting from a model of the airplane 201.

The actual configuration will be described below with reference to FIGS. 3A, 3B.

As shown in FIG. 3A, on the side of the airplane 201, three rectangular mirrors A1, A2 and A3 for carrying out the irregular reflections are pasted on edges of the door inlet 25. The mirrors A1, A2 and A3 can be attached to and detached from the airplane 201 and are flexible so as to cope with any curvature of any type of the airplane 201 (has a sufficient flexibility).

The mirrors A1, A2 and A3 are attached such that the ends of the mirrors A1, A2 and A3 are matched with the positions of the edges of the door inlet 25, respectively. However, the position matching does not require the high accuracy.

The door inlet 25 is constituted in the form of a rectangle in which a longitudinal side is approximately longer. The mirror A1 is placed at the edge of the door inlet 25 corresponding to a short side 25a positioned at its rectangular bottom. In the mirror A1, the long side of the mirror A1 is placed along the extension direction of the short side 25a of the door inlet 25.

In the mirror A2, the long side of the mirror A2 is placed along the extension direction of the rectangular long side 25b of the door inlet 25. In the mirror A3, similarly to the mirror A2, the long side of the mirror A3 is placed along the extension direction of another rectangular long side 25c of the door inlet 25. The mirror A2 and the mirror A3 are placed at the right-and-left symmetrical positions of the same height.

As shown in FIG. 3B, three sets B1, B2 and B3, each of which is composed of a laser irradiating (transmitting) unit and a receiver, are installed in the boarding bridge 101. The laser irradiating units and the receivers are defined as the single sets B1, B2 and B3, respectively. Thus, the irradiation and the reception of the laser are carried out at approximately the same position. The receiver can measure even the incident angle.

The set B1 is placed at the position corresponding to a bottom edge or periphery 35a of a connector 35 of the boarding bridge 101 connected to the door inlet 25. The set B2 and the set B3 are placed on substantially the same horizontal surface (the same height position) of the parts corresponding to both side edges or peripheries 35b, 35c of the connector 35.

The operation in this embodiment (the connection operation between the boarding bridge 101 and the airplane 201) will be described below with reference to FIGS. 4 to 7.

The laser lights irregularly reflected from the mirrors A1, A2 and A3 are surely captured by receivers B1R, B2R and B3R located at the positions substantially equal to the irradiation positions. The receivers B1R, B2R and B3R can measure the incident angles. Also, the receivers B1R, B2R and B3R detect only the reflection waves from the mirrors A1, A2 and A3 (do not detect the reflection wave from the airplane 201 except the mirrors A1, A2 and A3).

At first, a first step is carried out. That is, the upper and lower directions of the boarding bridge 101 are controlled so that a height from a ground of the reflector A1 is controlled so as to be equal to a height from the ground of the set B1 (First Step: Vertical Control Phase).

Figure 4:
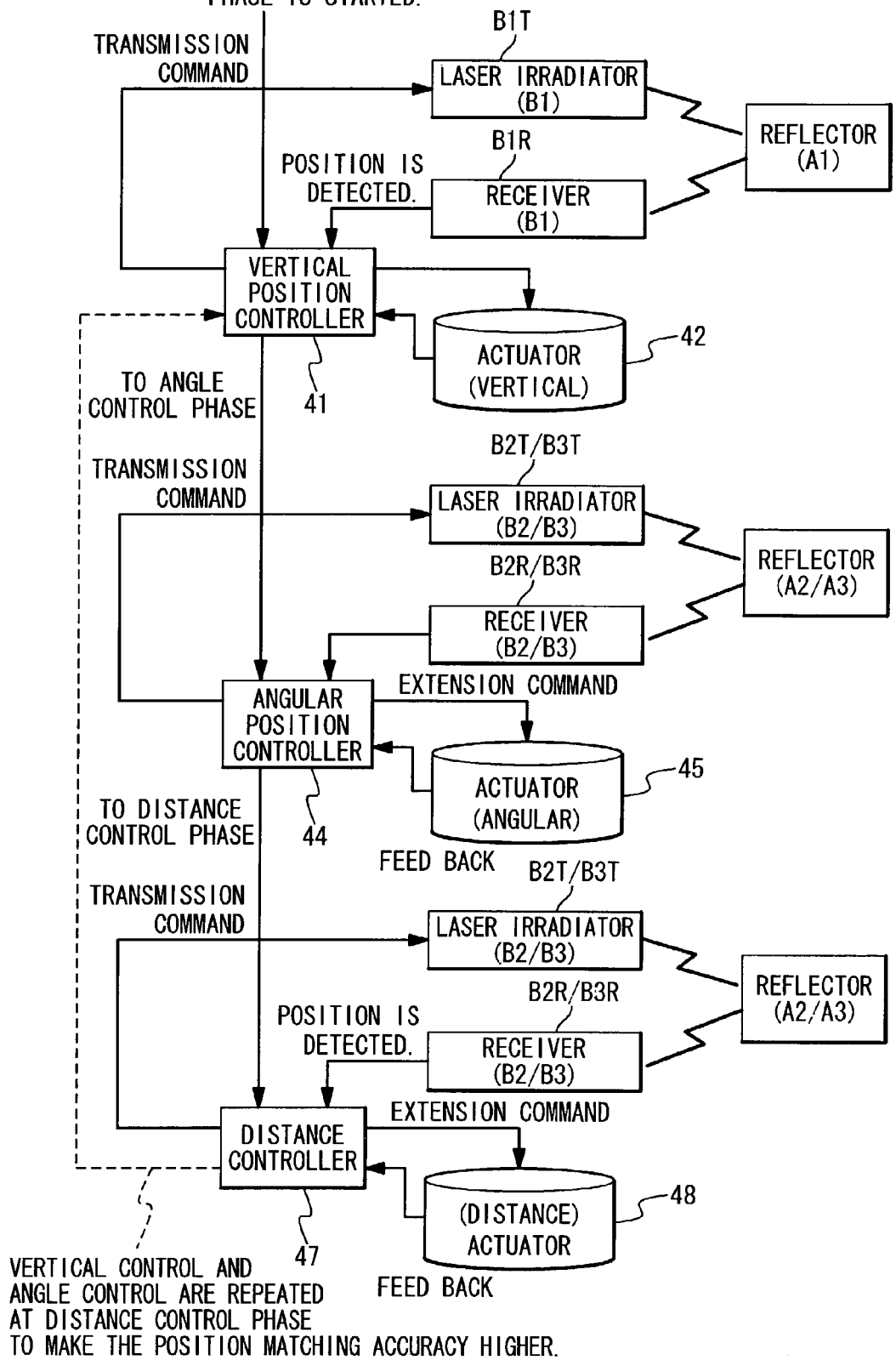
FIG. 4 is a control block diagram of the first embodiment of the automatic controlling apparatus of the boarding bridge in the present invention.
Figure 5:
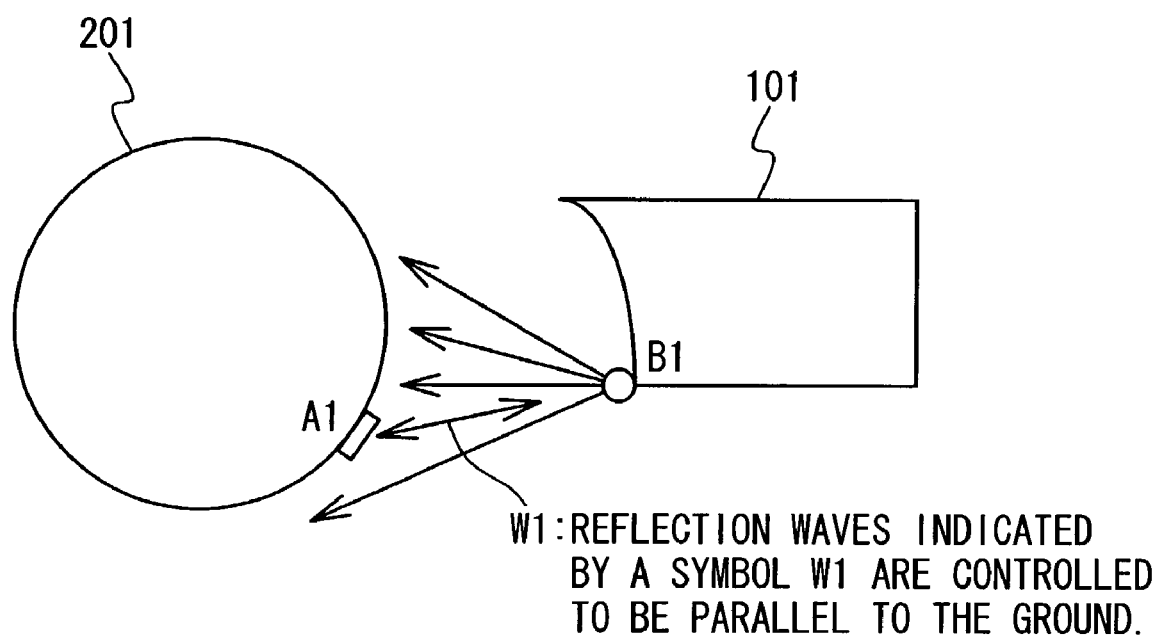
FIG. 5 is a view describing an operation at a first step of the first embodiment of the automatic controlling apparatus of the boarding bridge in the present invention.

The first step is concretely explained. As shown in FIGS. 4, 5, when the first step (the vertical control phase) is started, a vertical position controller 41 transmits a transmission command to a laser irradiator B1T of the set B1.

On receipt of the transmission command, the laser irradiator B1T of the set B1 irradiates the laser. The laser from the laser irradiator B1T is irradiated in all directions in three dimensions.

The receiver B1R of the set B1 measures the reflection angle from the reflector A1. The receiver B1R of the set B1 transmits the measured result to the vertical position controller 41. The vertical position controller 41 transmits an operation command to the vertical actuator 42, in accordance with the measured result, and controls the upper and lower directions of the boarding bridge 101 so that a vertical component of the reflection angle is 0 (parallel to the ground). That is, it is controlled such that a reflection wave indicated by a symbol W1 of FIG. 5 is parallel to the ground.

The vertical actuator 42 outputs the signal indicative of the result of the operation of the boarding bridge 101 to the vertical position controller 41. The transmission of the transmission command and/or the operation command from the vertical position controller 41 is executed until the reflection wave W1 from the reflector A1 becomes parallel to the ground.

By the way, the receiver B1R of the set B1 requires the idea that only the reflection wave from the reflector A1 can be measured. However, the idea is suitably employed from the known methods.

Next, a second step is carried out. That is, the position and the direction of the boarding bridge 101 are controlled. Then, the position and the angle of the connector 35 in the boarding bridge 101 are controlled within the horizontal plane (within the horizontal plane after the control in the upper and lower directions at the first step). Thus, it is made parallel to the airplane 201 (Second Step: Angle Control Phase).

Figure 6:
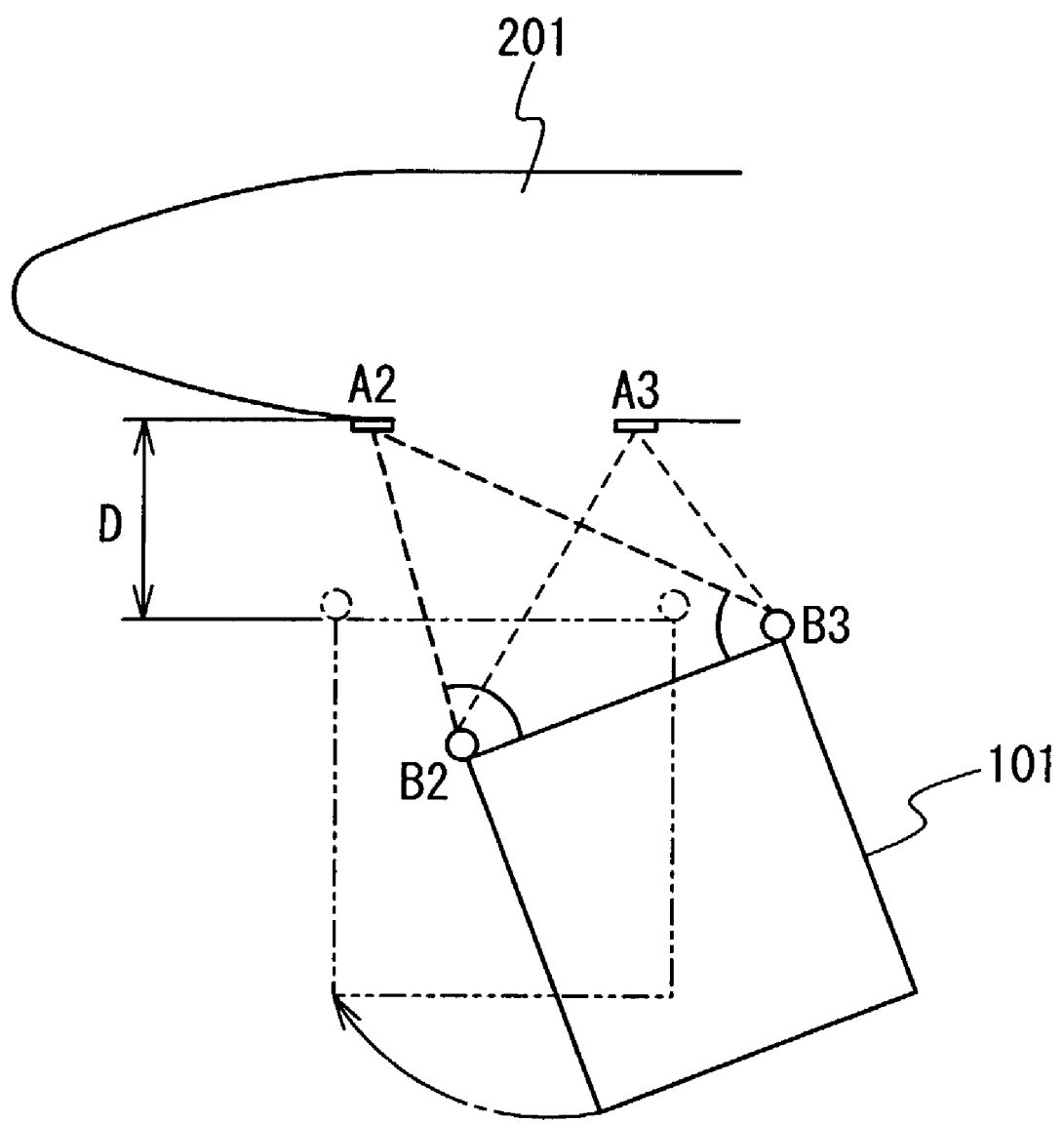
FIG. 6 is a view describing an operation at a second step of the first embodiment of the automatic controlling apparatus of the boarding bridge in the present invention.

The second step is concretely explained. As the result of the first step, if the vertical position controller 41 detects that the reflection wave W1 from the reflector A1 becomes parallel to the ground, as shown in FIGS. 4, 6, the vertical position controller 41 transmits a signal indicative of a start of the second step (angle control phase) to an angular position controller 44. Then, the step is started.

When the second step is started, the angular position controller 44 transmits the transmission command to the laser irradiators B2T, B3T of the sets B2, B3.

On receipt of the transmission command, the laser irradiators B2T, B3T of the sets B2, B3 irradiate the lasers. The lasers from the laser irradiators B2T, B3T of the sets B2, B3 are irradiated in all directions in three dimensions within the horizontal plane.

The receiver B2R of the set B2 measures the reflection angle from the reflector A2 and the reflector A3 (the incident angle of the reflection wave), and the receiver B3R of the set B3 measures the reflection angle from the reflector A2 and the reflector A3. Each of the receiver B2R of the set B2 and the receiver B3R of the set B3 transmits the measured result to the angular position controller 44.

The angular position controller 44 calculates the positional relation between the boarding bridge 101 and the airplane 201, in accordance with the measured results. That is, the angular position controller 44 calculates the movement distances in the forward, backward, right and left directions and the rotations within the horizontal plane, and then transmits the operation command corresponding to the calculated result to an angular direction actuator 45, and moves the boarding bridge 101 so that the set B2 and the set B3 arrive at the points respectively separated by a constant distance D from the reflector A2 and the reflector A3 of the airplane 201, as shown in FIG. 6.

The angular direction actuator 45 outputs a signal indicative of the result of the operation of the boarding bridge 101 to the angular position controller 44. The angular position controller 44 carries out a feed-back control based on the signal. The transmission of the transmission command and/or the operation command from the angular position controller 44 is executed until both of the distance between the set B2 and the reflector A2 and the distance between the set B3 and the reflector A3 become the constant distance D.

Next, a third step is carried out. That is, the boarding bridge 101 is moved (or, extended) and connected to the airplane 201 (Third Step: Distance Control Phase).

Figure 7:
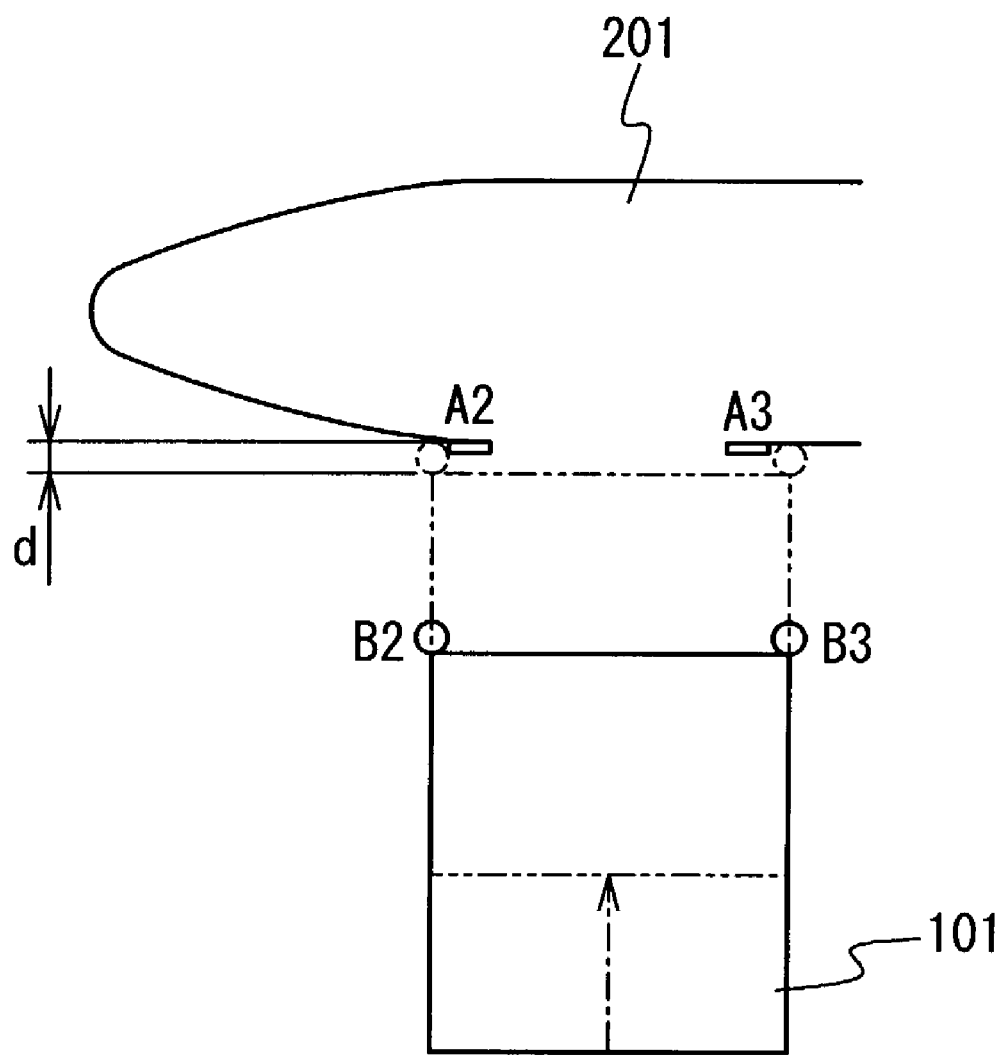
FIG. 7 is a view describing an operation at a third step of the first embodiment of the automatic controlling apparatus of the boarding bridge in the present invention.

The third step is concretely explained. As the result of the third step, if the angular position controller 44 detects that both of the distance between the set B2 and the reflector A2 and the distance between the set B3 and the reflector A3 become the constant distance D, as shown in FIGS. 4, 7, the angular position controller 44 transmits a signal indicative of a start of the third step (distance control phase) to a distance controller 47. Consequently, the third step is started.

When the third step is started, the distance controller 47 transmits the transmission command to the laser irradiators B2T, B3T of the sets B2, B3.

On receipt of the transmission command, the laser irradiators B2T, B3T of the sets B2, B3 irradiate the lasers. The lasers from the laser irradiators B2T, B3T of the sets B2, B3 are irradiated in all directions in three dimensions within the horizontal plane.

The receiver B2R of the set B2 measures the reflection angle from the reflector A2 (the incident angle of the reflection wave), and the receiver B3R of the set B3 measures the reflection angle from the reflector A3. Each of the receiver B2R of the set B2 and the receiver B3R of the set B3 transmits the measured result to the distance controller 47.

The distance controller 47 calculates the positional relation between the boarding bridge 101 and the airplane 201, in accordance with the measured results. That is, the distance controller 47 calculates the movement distances in the forward, backward, right and left directions within the horizontal plane, and then transmits the operation command corresponding to the calculated result to a distance direction actuator 48, and straightly moves and connects the boarding bridge 101 so that the set B2 and the set B3 arrive at the points respectively separated by a constant distance d from the reflector A2 and the reflector A3 of the airplane 201, as shown in FIG. 7.

If the angle control (rotation) is carried out in the vicinity of the airplane 201, there may be the fear of the damage to the airplane 201. Thus, this phase is separated from the angle control phase (the second step).

The distance direction actuator 48 outputs a signal indicative of the result of the operation of the boarding bridge 101 to the distance controller 47. The distance controller 47 carries out a feed-back control based on the signal. The transmission of the transmission command and/or the operation command from the distance controller 47 is executed until both of the distance between the set B2 and the reflector A2 and the distance between the set B3 and the reflector A3 become the constant distance d.

Also, as shown by a dashed line of FIG. 4, the repetition of the vertical and angle controls at the distance control phase can make the position matching accuracy higher.

According to this embodiment, it is possible to provide the following effects.

In a case of a commercial airplane, a height of a doorway is different depending on a position of an engine, a size of the engine and the like. Also, the position in the forward and backward direction of the airplane of the doorway is different depending on an indoor arrangement. Moreover, an airplane difference is induced depending on a hardstand position of the airplane.

Due to usage of the automatic position matching function in this embodiment, the work in which a fine adjustment is carried out by a human while it is checked by him or her until now can be done without any human error. Also, it is possible to cope with all models to be developed in the future without any process such as an addition of new data.

The automatic operation enables the saving of the number of flight crews and operators, which leads to a reduction in airport servicing cost. Also, the automatic operation enables the reliability to be improved, which leads to a reduction in the risk of damage to the airplane.

Moreover, the automatic operation enables a reduction in an airplane turnaround time.

According to this embodiment, this leads to the reduction in personal expenses. For example, it is enough to only monitor the automatic controlling apparatus in this embodiment. Thus, the operator to carry out the conventional manual operation is not required. For example, the countermeasure can be attained by using the process in which the automatic controlling apparatus is monitored by a ground attendant (for example, a check as to whether or not an error message is issued).

According to the automatic controlling apparatus of the boarding bridge in the present invention, it is possible to improve the reliability due to the automatic operation.

What is claimed is:

1. An automatic controlling system for performing automatic control of a boarding bridge so as to match a position of the boarding bridge with an airplane, said automatic controlling system comprising:

first and second reflectors;

first and second optical input/output units; and an actuator, wherein said first and second reflectors are placed at a same height with respect to each other, wherein said first and second optical input/output units are placed at a same height with respect to each other on a connector of the boarding bridge connected to a door inlet of the airplane, wherein said first and second optical input/output units include a first light irradiator which irradiates light toward said first and second reflectors, a second light irradiator which irradiates light toward said first and second reflectors, a first optical sensor operable to detect first and second reflection waves of the light reflected from said first and second reflectors, and a second optical sensor operable to detect said first and second reflection waves of the light reflected from said first and second reflectors, wherein said actuator moves the boarding bridge such that positions of the boarding bridge and the airplane are matched with each other, based on a detection result of the reflection waves of the light detected by said first and second optical sensors, and wherein said automatic controlling system is unaware of a detailed position of a door of the airplane prior to starting the automatic control of the boarding bridge.

2. The automatic controlling system according to claim 1, wherein said first and second reflectors are placed near the door inlet of the airplane.

3. The automatic controlling system according to claim 1, wherein said first light irradiator and said first optical sensor are placed at positions close to each other, and wherein said second light irradiator and said second optical sensor are placed at positions close to each other.

4. The automatic controlling system according to claim 1, wherein each of said first and second reflectors has a sufficient flexibility so as to enable said first and second reflectors to be provided on an airplane having any type of curvature.

* * * * *